United States Patent
OH

(10) Patent No.: US 7,697,931 B2
(45) Date of Patent: Apr. 13, 2010

(54) METHOD FOR PERFORMING ACCESS PROCEDURE OF MOBILE COMMUNICATION TERMINAL IN DATA COMMUNICATION SYSTEM, AND MOBILE COMMUNICATION TERMINAL USING THE SAME

(75) Inventor: Seon Ju OH, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 392 days.

(21) Appl. No.: 11/567,608

(22) Filed: Dec. 6, 2006

(65) Prior Publication Data

US 2007/0127402 A1   Jun. 7, 2007

(30) Foreign Application Priority Data

Dec. 6, 2005   (KR) ................ 10-2005-0118208

(51) Int. Cl.
  *H04W 4/00* (2009.01)
(52) U.S. Cl. ............... 455/434; 455/432.1; 455/435.2; 455/436; 370/328; 370/329; 370/310
(58) Field of Classification Search ............ 370/310, 370/328, 329; 455/418, 423.1, 434, 435.2, 455/436, 552.1, 553.1, 432.1
See application file for complete search history.

(56) References Cited

U.S. PATENT DOCUMENTS

| | | | |
|---|---|---|---|
| 5,910,949 A * | 6/1999 | Bilstrom et al. ............ | 370/337 |
| 6,400,964 B1 * | 6/2002 | Zicker et al. ............. | 455/553.1 |
| 6,430,417 B1 * | 8/2002 | Raith et al. ................. | 455/466 |
| 6,493,629 B1 * | 12/2002 | Van Bosch .................. | 701/207 |
| 6,643,318 B1 * | 11/2003 | Parsa et al. ................. | 375/141 |
| 6,819,711 B1 * | 11/2004 | Forde ......................... | 375/224 |
| 2001/0018348 A1 * | 8/2001 | Joshi et al. .................. | 455/450 |

FOREIGN PATENT DOCUMENTS

KR   10-2004-0035511   4/2004

OTHER PUBLICATIONS

3GPP, "Digital Cellular Telecommunication System (Phase 2+); General Packet Radio Service (GPRS); Mobile Station (MS)—Base Station System (BSS) Interface; Radio Link Control/Medium Access Control (RLC/MAC) protocol" ,3GPP TS 04.60 Version 8.21.0 Release 1999—ETSI TS 101 349 V8.21.0 (Dec. 2003), Chapter 7, pp. 39-58.*

* cited by examiner

*Primary Examiner*—Lewis G West
*Assistant Examiner*—Dung Hong
(74) *Attorney, Agent, or Firm*—Workman Nydegger

(57) ABSTRACT

A method and system for performing an access procedure of a mobile communication terminal in a data communication system are disclosed. An exemplary method includes performing an access procedure with a network according to an established access type. The method then determines whether a failure of the access procedure has occurred. A counter value of an access control module is adjusted according to the determined result. Based on the magnitude of the adjusted counter value, the established access type may be abandoned, and another access type may be selected. Therefore, the access procedure suitable for the network environment is executed, such that the probability of success of the access procedure increases.

16 Claims, 5 Drawing Sheets

METHOD FOR PERFORMING ACCESS PROCEDURE OF MOBILE COMMUNICATION TERMINAL IN DATA COMMUNICATION SYSTEM, AND MOBILE COMMUNICATION TERMINAL USING THE SAME

CROSS-REFERENCE TO RELATED APPLICATIONS

This application claims the priority benefit of Korean Patent Application No. 10-2005-0118208, filed on Dec. 6, 2005, which is hereby incorporated by reference as if fully set forth herein.

BACKGROUND OF THE INVENTION

1. Field of the Invention

The present invention relates to a method for accessing a network using a mobile communication terminal. More particularly, the present invention relates to a method for allowing a data communication system to abandon a predetermined access type during the access procedure of the data communication system, select a new access type, and perform an access procedure according to the selected access type, and a mobile communication terminal using the same.

2. Discussion of the Related Art

A conventional packet access procedure of a mobile communication terminal will hereinafter be described. The conventional packet access procedure of the mobile communication terminal will be described on the basis of a specific packet access procedure for use in a General Packet Radio Service (GPRS) system.

The mobile communication terminal selects any one of a first phase access type and a second phase access type, and performs the packet access procedure according to the selected access type. In this case, the second phase access type can be implemented at an acknowledged or unacknowledged mode of a Radio Link Control (RLC) layer. However, the first phase access type can be implemented at only the acknowledged mode.

Therefore, in order to perform the access procedure at all modes, the mobile communication terminal for use in most networks sets the second phase access type to a default access format. Although the mobile communication terminal enters the network suitable for the first phase access type, it should perform an access procedure of the second phase access type, such that the probability of failure in the access procedure rapidly increases.

Compared with the access procedure for the first phase access type, the access procedure for the second phase access type further includes a process for transmitting/receiving a message to/from a network. In this case, the probability of failure in the access procedure for the second phase access type is higher than that of the first phase access type.

Although the network environment is not suitable for the predetermined access type pre-established in the mobile communication terminal, the mobile communication terminal cannot automatically select or change the access type according to the network environment.

SUMMARY OF THE INVENTION

Accordingly, one embodiment of the present invention is directed to a method for performing an access procedure of a mobile communication terminal in a data communication system. The method includes performing an access procedure with a network according to an established access type. The method also determines whether a failure of the access procedure has occurred. A counter value of an access control module is adjusted according to the determined result. Based on a magnitude of the adjusted counter value, the established access type may be abandoned, and another access type may be selected.

In another embodiment of the present invention, a mobile communication terminal is provided for performing an access procedure in a data communication system. The mobile communication terminal includes a transceiver for performing an access procedure with a network according to an established access type. The transceiver also transmits and receives a predetermined message to and from the network during the access procedure. The mobile communication terminal includes an access control module for determining whether a failure occurs in the access procedure, and adjusting a counter value according to the determined result. A controller generates a control signal according to the failure or success of the access procedure, and may abandon the established access type based on a magnitude of the counter value. If the established access type is abandoned, the controller may also select another access type.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In the following detailed description of various embodiments of the invention, reference is made to the accompanying drawings which form a part hereof, and in which are shown by way of illustration specific embodiments in which the invention may be practiced. It is to be understood that other embodiments may be utilized and structural changes may be made without departing from the scope of the present invention. Wherever possible, the same reference numbers will be used throughout the drawings to refer to the same or like parts.

Figure 1:
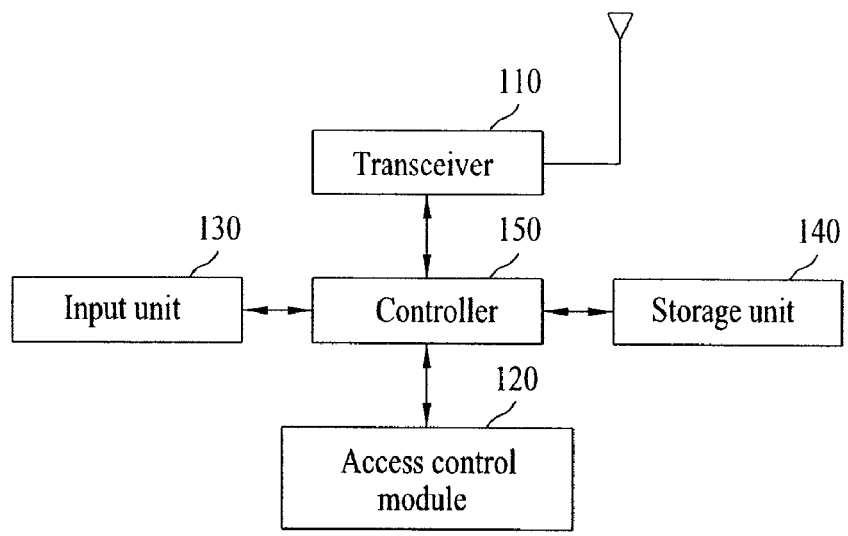
FIG. 1 is a block diagram illustrating a mobile communication terminal for performing an access procedure according to the present invention.

FIG. 1 is a block diagram illustrating a mobile communication terminal for performing an access procedure according to the present invention. Referring to FIG. 1, the mobile communication terminal includes a transceiver 110, an access control module 120, an input unit 130, a storage unit 140, and a controller 150.

The transceiver 110 transmits or receives a predetermined message to/from a network. Specifically, the transceiver 110 transmits or receives a predetermined message to/from the network during the access procedure corresponding to a predetermined access type of the mobile communication terminal. For the convenience of description, it is assumed that the mobile communication terminal performs any one of the access procedures shown in FIGS. 6A and 6B.

Figure 6A:
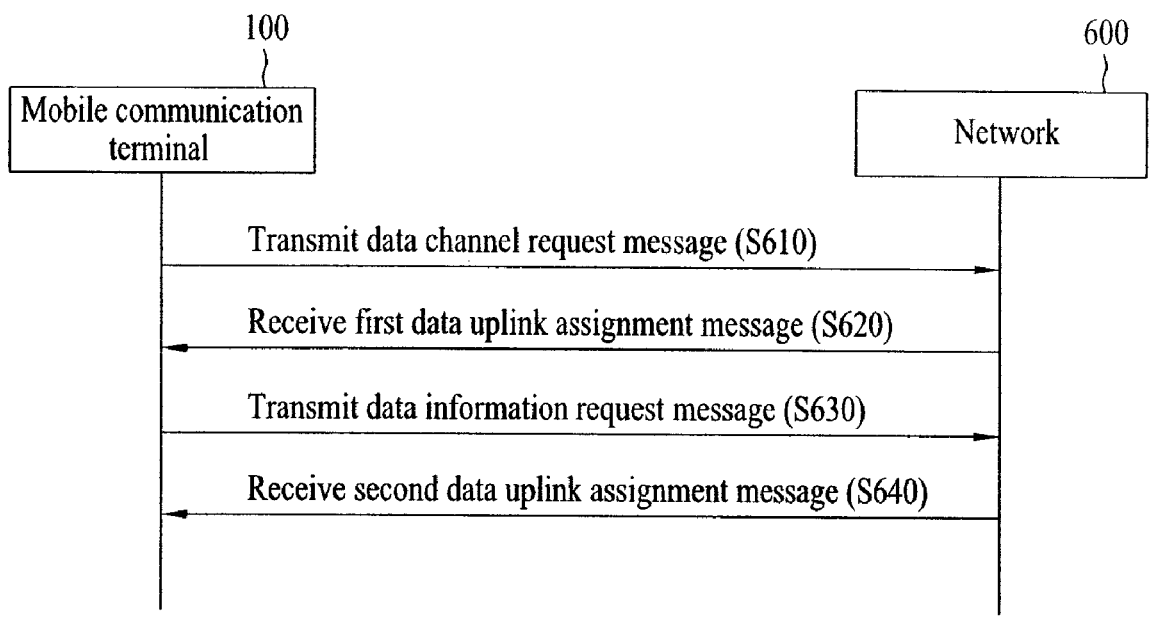
FIG. 6A is a flow chart illustrating an access procedure according to a second access type of the present invention.
Figure 6B:
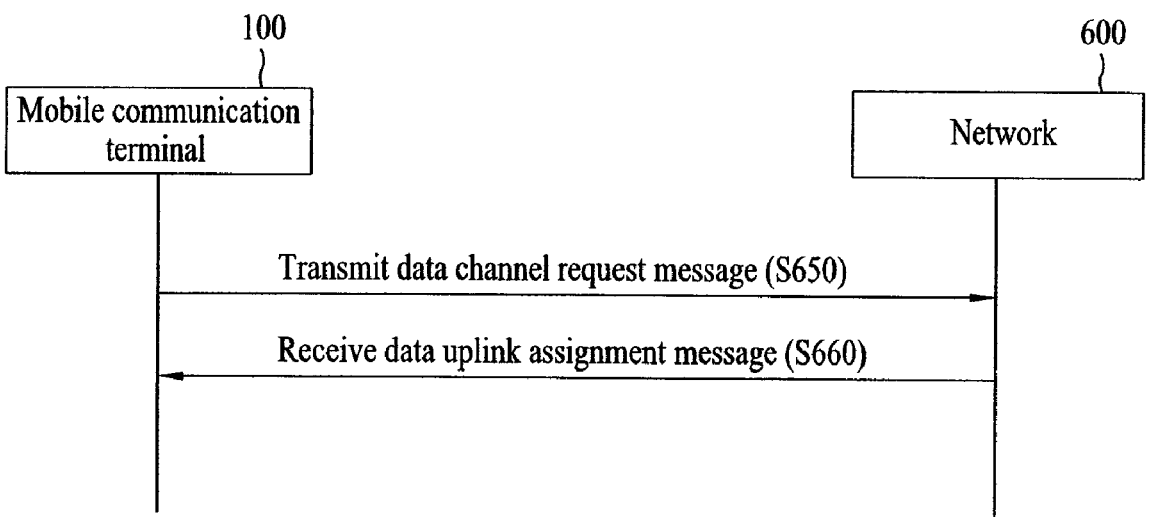
FIG. 6B is a flow chart illustrating an access procedure according to a first access type of the present invention.

FIG. 6A is a flow chart illustrating an access procedure according to a second access type of the present invention. FIG. 6B is a flow chart illustrating an access procedure according to a first access type of the present invention. FIGS. 6A and 6B show the packet access procedures for a data communication system (e.g., a General Packet Radio Service (GPRS) system). The access type of FIG. 6A is different from that of FIG. 6B. In more detail, FIG. 6A shows a packet access procedure according to a second phase access type of the GPRS system, and FIG. 6B shows a packet access procedure according to a first phase access type of the GPRS system.

Referring to FIG. 6A, the transceiver 110 may transmit a data channel request message to the network 600, and receive a first data uplink assignment message from the network 600. The transceiver 110 may transmit a data information request message to the network 600, and may receive a second data uplink assignment message from the network 600. In one embodiment, the data channel request message for the GPRS system is a packet channel request message, and the first data uplink assignment message is a first packet UL assignment message.

Referring to FIG. 6B, the transceiver 110 may transmit the data channel request message to the network 600, and receive a data uplink assignment message from the network 600. In one embodiment, the data channel request message is a packet channel request message, and the data uplink assignment message is a packet UL assignment message.

Referring again to FIG. 1, the access control module 120 may determine whether the access procedure executed by the transceiver 110 fails, and may adjust a counter value according to the determined result. The access control module 120 may initialize the counter value prior to the execution of the access procedure. In this case, the initialized counter value may be pre-established or may also be established by a user. In one embodiment, the access control module 120 may reduce the counter value in the case of a failure of the access procedure, and/or may increase the counter value in the case of a success of the access procedure. In this case, the magnitude of the increasing or reducing counter value may be pre-established, or may also be established by the user.

For example, the access control module 120 may reduce the counter value by a predetermined number "3" in the case of the failure of the access procedure, or may increase the counter value by a predetermined number "1" in the case of the success of the access procedure.

In another embodiment, the access control module 120 increases the counter value in the case of the failure of the access procedure, or reduces the counter value in the case of the success of the access procedure. For example, the access control module 120 may increase the counter value by a predetermined number "3" in the case of the failure of the access procedure, or may reduce the counter value by a predetermined number "1" in the case of the success of the access procedure.

The input unit 130 may receive a predetermined operation command from the user of the mobile communication terminal. For example, in one embodiment the input unit 130 receives a command for selecting an access type selection function from the user. In this case, the input unit 130 may include an additional key for selecting the access type selection function as necessary.

Therefore, the mobile communication terminal receives the user's selection command through the input unit 130, and may establish a function for selecting a new access procedure if the access procedure based on the predetermined access type fails. In the meantime, although there is no user's selection command, the mobile communication terminal may determine the access type selection function to be a default function.

The storage unit 140 may store all I/O (Input/Output) data of the mobile communication terminal, and may store a program required for performing functions/operations implemented by the mobile communication terminal. The storage unit 140 may also store a program for implementing an access type selection algorithm according to the present invention.

The controller 150 controls overall functions and operations of the mobile communication terminal 100. For example, the controller 150 may determine whether the access procedure fails, and may output a control signal based on the determined result to the access control module 120.

A method for determining the failure of the access procedure will hereinafter be described with reference to FIGS. 6A and 6B. As previously stated above, FIGS. 6A and 6B show access procedures based on different access types.

Referring to FIG. 6A, if at least one of the following cases occurs, the controller 150 determines that a failure of the access procedure has occurred. The first case is that the number of transmission times that the data channel request message has been transmitted increases. For example, if the number of transmission times of the data channel request message increases in the GPRS system, this indicates that a retransmission counter value increases.

The second case is that a first data uplink assignment message is not received within a predetermined period of time. The third case is that a second data uplink assignment message is not received within a predetermined period of time. If the first or second data uplink assignment message is not received within a predetermined period of time, this indicates that a single block is not received within the predetermined period of time.

The fourth case is that specific information contained in the second data uplink assignment message is different from information stored in the mobile communication terminal 100. If the specific information contained in the second data uplink assignment message is different from the information stored in the mobile communication terminal 100, this indicates that content resolution fails. As stated previously, if any one of these four cases occurs, the controller 150 determines that the access procedure has failed.

Referring to FIG. 6B, if at least one of the following cases occurs, the controller 150 determines that the access procedure has failed. The first case is that the number of times that the data channel request message has been transmitted increases. For example, the number of times that the data channel request message has been transmitted may be engaged between the mobile communication terminal 100 and the network 600, prior to the execution of the access procedure.

The second case is that a data uplink assignment message is not received within a predetermined period of time. The predetermined period of time is indicative of a maximum time assigned to the reception of the first or second data uplink assignment message, and is engaged between the mobile communication terminal 100 and the network 600. The maximum time assigned to the reception of the data uplink assignment message is engaged between the mobile communication terminal 100 and the network 600.

The third case is that specific information contained in the data uplink assignment message is different from information stored in the mobile communication terminal 100. In one embodiment, the information of the GPRS system is a TLLI (Temporary Logical Link Identification) value, and is a unique value assigned to individual terminals by the network 600. Therefore, if the TLLI value contained in the second data uplink assignment message or the data uplink assignment message is different from a TLLI value pre-stored in the mobile communication terminal 100, the mobile communication terminal 100 determines that the second data uplink assignment message or the data uplink assignment message to be transmitted to another terminal has been wrongly transmitted to the mobile communication terminal itself. As stated previously, if any one of these three cases occurs, the controller 150 determines that the access procedure has failed.

The controller 150 may determine the magnitude of the counter value adjusted by the access control module 120, and may also determine whether to continuously maintain a predetermined access type or to newly select another access type after abandoning the predetermined access type. The reference value of the counter value may be established by the controller 150.

In one embodiment, if the access procedure fails, the access control module 120 reduces the counter value. If the access procedure does not fail, the access control module 120 increases the counter value. In this case, if the counter value is less than the reference value, the controller 150 abandons the predetermined access type, and selects another access type.

In another embodiment, if the access procedure fails, the access control module 120 increases the counter value. If the access procedure does not fail, the access control module 120 reduces the counter value. In this case, if the counter value is equal to or greater than the reference value, the controller 150 abandons the predetermined access type, and selects another access type.

In one embodiment, if the predetermined access type of the GPRS system is the first phase access type, another access type is indicative of the second phase access type. If the predetermined access type of the GPRS system is the second phase access type, another access type may be indicative of the first phase access type.

Figure 2:
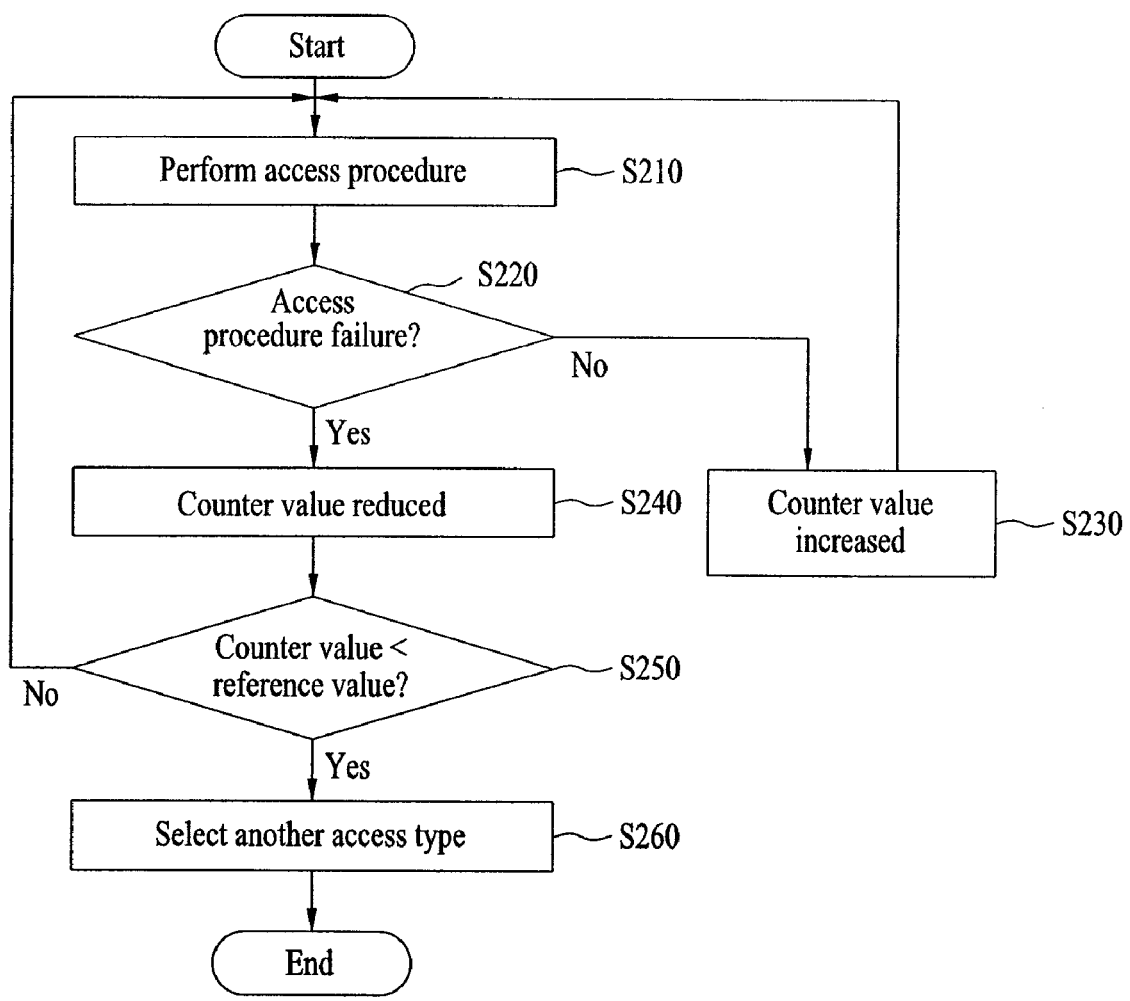
FIG. 2 is a flow chart illustrating a method for performing a general access procedure of a mobile communication terminal according to one embodiment of the present invention.

A method for performing the access procedure of the mobile communication terminal in a data communication system according to the present invention will hereinafter be described with reference to FIGS. 2 and 3. FIG. 2 is a flow chart illustrating a method for performing a general access procedure of a mobile communication terminal according to one embodiment of the present invention.

Referring to FIG. 2, the mobile communication terminal 100 performs the access procedure according to the established access type at step S210. Referring again to FIGS. 1, 6A and 6B, the mobile communication terminal 100 may initialize the counter value of the access control module 120 contained in the mobile communication terminal 100 prior to the execution of the access procedure. In one embodiment, the initialized counter value may be pre-established or may also be established by a user.

In another embodiment, the mobile communication terminal 100 performs any one of the access procedures shown in FIGS. 6A and 6B according to the established access type. For example, if the data communication system is indicative of the GPRS system, FIG. 6A shows the access procedure according to the second phase access type, and FIG. 6B shows another access procedure according to the first phase access type. As shown in FIG. 6A, if the second phase access type is established, the mobile communication terminal 100 transmits the data channel request message to the network 600 at S610. The network 600 answers the data channel request message, and transmits the first data uplink assignment message to the mobile communication terminal 100 at S620. The mobile communication terminal 100 transmits the data information request message to the network 600 at S630. The network 600 answers the data information request message, and transmits the second data uplink assignment message to the mobile communication terminal 100 at S640.

For example, as shown in FIG. 6B, if the first phase access type is established, the mobile communication terminal 100 transmits the data channel request message to the network 600 at S650. The network 600 answers the data channel request message, and transmits the data uplink assignment message to the mobile communication terminal 100 at S660.

In the meantime, due to the occurrence of an unexpected error at each stage of the access procedure, the access procedure may fail. A detailed description thereof will hereinafter be described. Referring again to FIGS. 2 and 6A, the mobile communication terminal 100 determines whether a current access procedure fails at S220. The method for determining whether the current access procedure fails will be described in further detail below with reference to FIG. 3. If the access procedure does not fail at S220, the mobile communication terminal 100 increases the counter value of the access control module 120 at S230. If the access procedure fails at S220, the mobile communication terminal 100 reduces the counter value of the access control module 120 at S240.

Referring again to FIG. 1, the controller 150 of the mobile communication terminal 100 determines whether the increased or reduced counter value is less than a reference value stored in the mobile communication terminal at S250. If the increased or reduced counter value is less than the reference value at S250, the mobile communication terminal 100 abandons the established access type, and selects another access type at S260. Thereafter, the mobile communication terminal 100 performs a new access procedure according to the selected access type.

Figure 3:
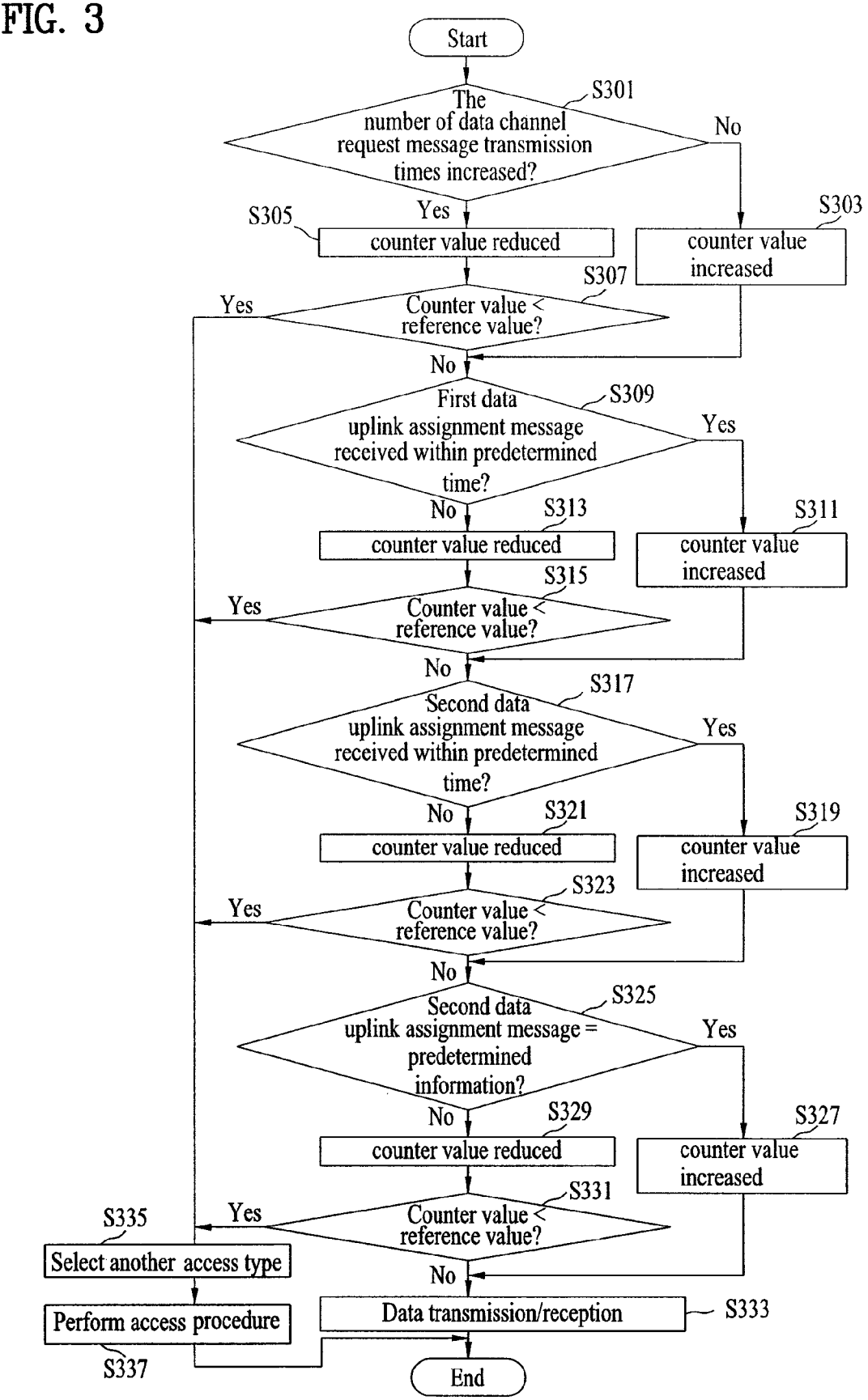
FIG. 3 is a flow chart illustrating a method for performing a detailed access procedure of a mobile communication terminal according to one embodiment of the present invention.

FIG. 3 is a flow chart illustrating a method for performing a detailed access procedure of a mobile communication terminal according to one embodiment of the present invention. If an unexpected error occurs in the access procedure of FIG. 6A, a method for reducing the counter value of the access control module 120 and determining whether the access procedure fails by referring to the reduced counter value will hereinafter be described with reference to FIG. 3.

It is assumed that the access procedure is executed as shown in FIG. 6A or 6B. As previously stated above, FIGS. 6A and 6B show access procedures of different access types. Specifically, in the case of the GPRS system, FIG. 6A shows the access procedure according to the second phase access type, and FIG. 6B shows the access procedure according to the first phase access type. As described previously, if the number of transmission times of the data channel request message increases, if the first or second data uplink assignment message is not received within a predetermined period of time, or if specific information contained in the second data uplink assignment message is different from information stored in the mobile communication terminal 100, the mobile communication terminal 100 determines that the access procedure has failed.

Referring again to FIG. 3, the mobile communication terminal 100 determines whether the number of transmission times of the data channel request message increases at S301. The number of transmission times of the data channel request message is engaged between the mobile communication terminal 100 and the network 600, prior to the execution of the access procedure. If the number of transmission times of the data channel request message does not increase at S301, the mobile communication terminal 100 increases the counter value at S303. Otherwise, if the number of transmission times of the data channel request message increases at S301, the mobile communication terminal 100 reduces the counter value at S305. In this case, the increased number of transmission times of the data channel request message indicates that the transmission of the data communication has failed, or indicates that the reception of a response message of the data channel request message has failed. Specifically, in the case of the GPRS system, the number of transmission times is indicative of a retransmission counter value.

The mobile communication terminal 100 determines whether the counter value is less than a reference value at S307. If the counter value is less than the reference value at S307, the mobile communication terminal 100 abandons the pre-established access type, and selects another access type at S335. In one embodiment, the established access type is the second phase access type, and another access type is the first phase access type.

The mobile communication terminal 100 determines whether the first data uplink assignment message is received within a predetermined period of time at S309. The predetermined period of time is a maximum time assigned to the reception of the first data uplink assignment message, and is engaged between the mobile communication terminal 100 and the network 600. If the first data uplink assignment message is received within the predetermined period of time at S309, the mobile communication terminal 100 increases the counter value at S311. Otherwise, if the first data uplink assignment message is not received within the predetermined period of time at S309, the mobile communication terminal 100 reduces the counter value at S313.

The mobile communication terminal 100 determines whether the counter value is less than a reference value at S315. If the counter value is less than the reference value at S315, the mobile communication terminal 100 abandons the established access type, and selects another access type at S335. In this case, the established access type is the second phase access type, and another access type is the first phase access type.

The mobile communication terminal 100 determines whether the second data uplink assignment message is received within a predetermined period of time at S317. The predetermined period of time is a maximum time assigned to the reception of the second data uplink assignment message, and is engaged between the mobile communication terminal 100 and the network 600.

If the second data uplink assignment message is received within the predetermined period of time at S317, the mobile communication terminal 100 increases the counter value at S319. Otherwise, if the second data uplink assignment message is not received within the predetermined period of time at S317, the mobile communication terminal 100 reduces the counter value at S321.

The mobile communication terminal 100 determines whether the counter value is less than the reference value at S323. If the counter value is less than the reference value at S323, the mobile communication terminal 100 abandons the established access type, and selects another access type at S335. In one embodiment, the established access type is the second phase access type, and another access type is the first phase access type.

The mobile communication terminal 100 determines whether specific information contained in the second data uplink assignment message is equal to specific information stored in the mobile communication terminal 100 at S325. The specific information is a TLLI (Temporary Logical Link Identification) value, and is a unique value assigned to individual terminals by the network 600. Therefore, if the TLLI value contained in the second data uplink assignment message is different from a TLLI value pre-stored in the mobile communication terminal 100, the mobile communication terminal 100 determines that the second data uplink assignment message to be transmitted to another terminal has been wrongly transmitted to the mobile communication terminal 100 itself.

If the specific information contained in the second data uplink assignment message is equal to that stored in the mobile communication terminal 100 at S325, the mobile communication terminal 100 increases the counter value at S327. Otherwise, if the specific information contained in the second data uplink assignment message is different from that stored in the mobile communication terminal 100 at S325, the mobile communication terminal 100 reduces the counter value at S329.

The mobile communication terminal 100 determines whether the counter value is less than the reference value at S331. If the counter value is equal to or greater than the reference value at S331, the mobile communication terminal 100 transmits or receives data to/from the network 600 at S333. If the counter value is less than the reference value at S331, the mobile communication terminal 100 abandons the established access type, and selects another access type at S335. In one embodiment, the established access type is the second phase access type, and the other access type is the first phase access type.

The mobile communication terminal 100 performs the access procedure according to the newly-selected access type at S337. In one embodiment, the newly-selected access type is the first phase access type, such that the mobile communication terminal 100 performs the access procedure of FIG. 6B.

Provided that the mobile communication terminal 100 selects the first phase access type, the mobile communication terminal 100 performs the access procedure of FIG. 6B, and determines the presence or absence of the failure in the access procedure. As a result, the mobile communication terminal 100 selects the second phase access type according to the determined result, and is able to perform the access procedure corresponding to the selected second phase access type.

In this case, as described previously, if the number of transmission times of the data channel request message increases, if the data uplink assignment message is not received within a predetermined period of time, or if specific information contained in the data uplink assignment message is different from the information stored in the mobile communication terminal, the mobile communication terminal determines that the access procedure has failed.

Figure 4:
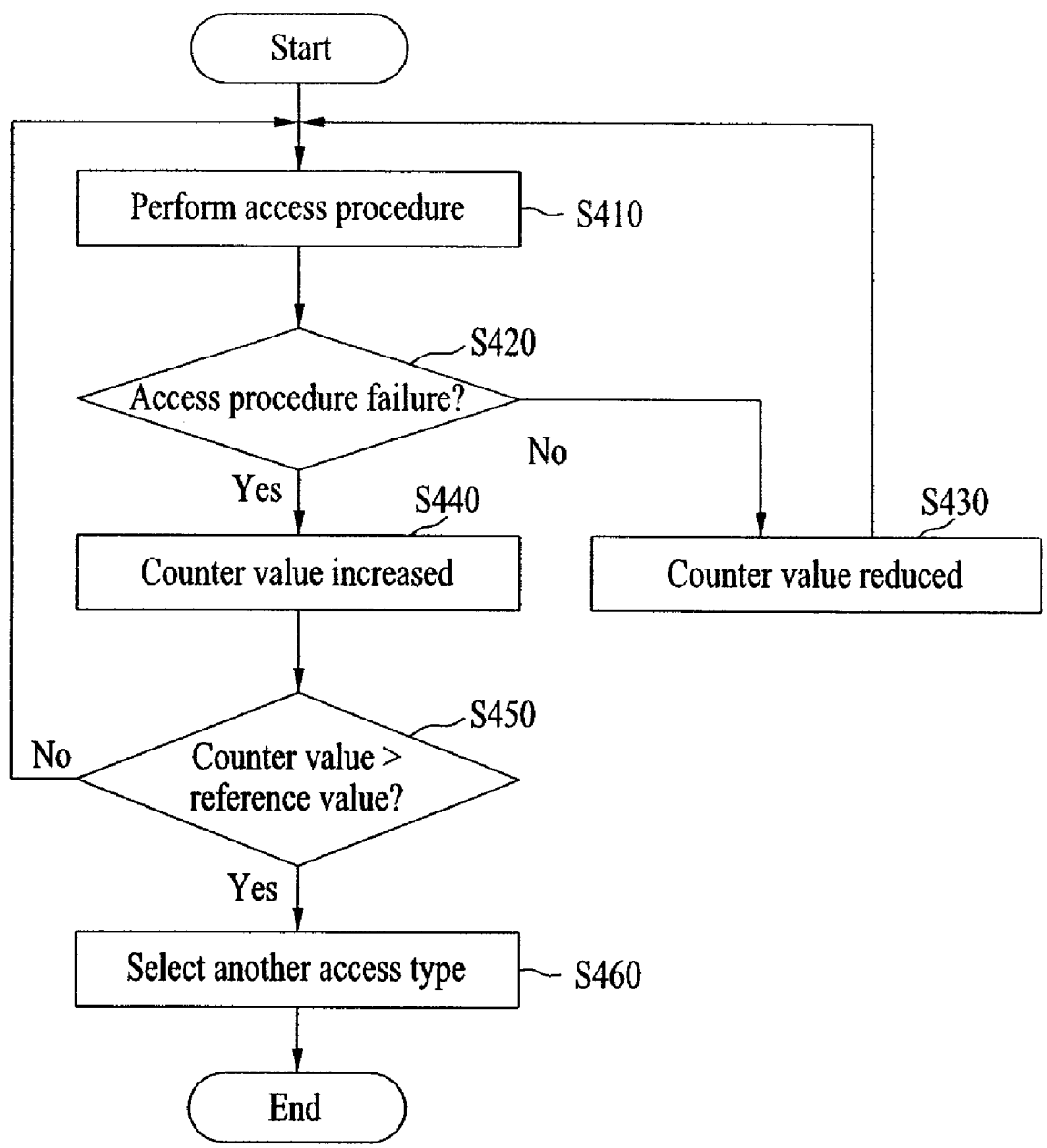
FIG. 4 is a flow chart illustrating a method for performing an access procedure of a mobile communication terminal according to another embodiment of the present invention.
Figure 5:
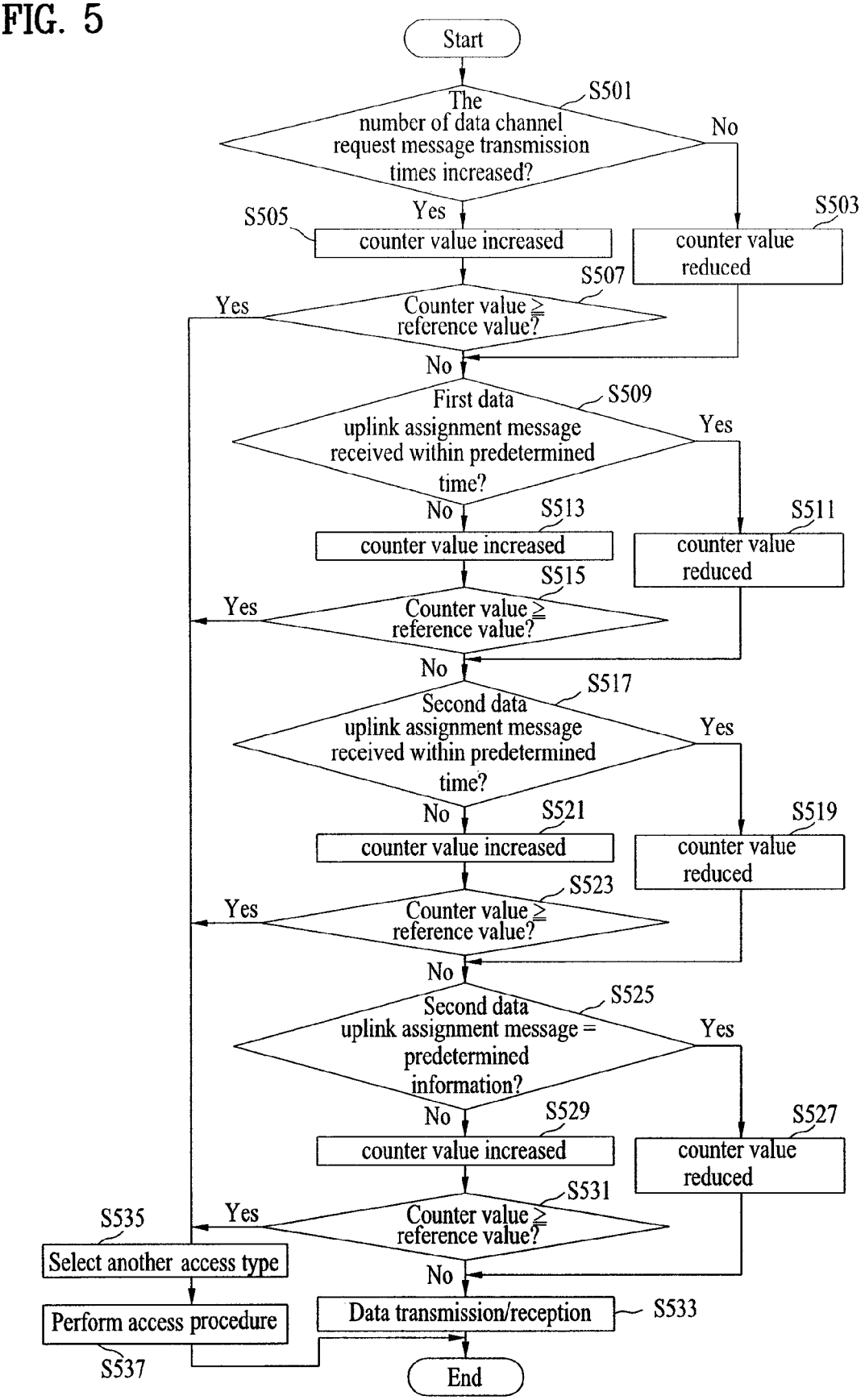
FIG. 5 is a flow chart illustrating a method for performing a detailed access procedure of a mobile communication terminal according to another embodiment of the present invention.

A method for performing an access procedure of a mobile communication terminal in a data communication system according to another embodiment of the present invention will hereinafter be described with reference to FIGS. 4 and 5. FIG. 4 is a flow chart illustrating a method for performing an access procedure of a mobile communication terminal according to another embodiment of the present invention. FIG. 5 is a flow chart illustrating a method for performing a detailed access procedure of a mobile communication terminal according to another embodiment of the present invention.

Referring to FIG. 4, the mobile communication terminal 100 performs the access procedure according to the established access type at S410, in a similar manner as was described at S210 of FIG. 2. The mobile communication terminal 100 determines whether a current access procedure has failed at S420. A method for determining whether the above-mentioned access procedure fails will hereinafter be described with reference to FIG. 5.

If the access procedure does not fail at S420, the mobile communication terminal 100 reduces the counter value of the access control module at S430. Otherwise, if the access procedure fails at S420, the mobile communication terminal 100 increases the counter value of the access control module 120 at S440.

The mobile communication terminal 100 determines whether the reduced or increased counter value is equal to or greater than a reference value stored in the mobile communication terminal 100 at S450. If the reduced or increased counter value is equal to or greater than the reference value stored in the mobile communication terminal 100 at S450, the mobile communication terminal 100 abandons the established access type, and selects another access type at S460. Thereafter, the mobile communication terminal 100 performs a new access procedure according to the selected access type.

If an unexpected error occurs in the access procedure of FIG. 6A, a method for increasing the counter value of the access control module 120 and determining whether the access procedure fails by referring to the increased counter value will hereinafter be described with reference to FIG. 5. Referring to FIG. 5, the mobile communication terminal 100 determines whether the number of transmission times of the data channel request message increases at S501. If the number of transmission times of the data channel request message does not increase at S501, the mobile communication terminal 100 reduces the counter value at S503. Otherwise, if the number of transmission times of the data channel request message increases at S501, the mobile communication terminal 100 increases the counter value at S505.

The mobile communication terminal 100 determines whether the counter value is equal to or greater than the reference value at S507. If the counter value is equal to or greater than the reference value at S507, the mobile communication terminal 100 abandons the established access type, and selects another access type at S535. In one embodiment, the established access type is indicative of the second phase access type, and another access type is indicative of the first phase access type.

The mobile communication terminal 100 determines whether the first data uplink assignment message is received within a predetermined period of time at S509. If the first data uplink assignment message is received within the predetermined period of time at S509, the mobile communication terminal 100 reduces the counter value at S511. Otherwise, if the first data uplink assignment message is not received within the predetermined period of time at S509, the mobile communication terminal 100 increases the counter value at S513.

The mobile communication terminal 100 determines whether the counter value is equal to or greater than the reference value at S515. If the counter value is equal to or greater than the reference value at S515, the mobile communication terminal 100 abandons the established access type, and selects another access type at S535. In one embodiment, the established access type is indicative of the second phase access type, and another access type is indicative of the first phase access type.

The mobile communication terminal 100 determines whether the second data uplink assignment message is received within a predetermined period of time at S517. If the second data uplink assignment message is received within the predetermined period of time at S517, the mobile communication terminal 100 reduces the counter value at S519. Otherwise, if the second data uplink assignment message is not received within the predetermined period of time at S517, the mobile communication terminal 100 increases the counter value at S521.

The mobile communication terminal 100 determines whether the counter value is equal to or greater than the reference value at S523. If the counter value is equal to or greater than the reference value at S523, the mobile communication terminal 100 abandons the established access type, and selects another access type at S535. In one embodiment, the established access type is indicative of the second phase access type, and the other access type is indicative of the first phase access type.

The mobile communication terminal 100 determines whether specific information contained in the second data uplink assignment message is equal to information stored in the mobile communication terminal 100 at S525. If the specific information contained in the second data uplink assignment message is equal to the information stored in the mobile communication terminal 100 at S525, the mobile communication terminal 100 reduces the counter value at S527. If the specific information contained in the second data uplink assignment message is different from the information stored in the mobile communication terminal 100 at S525, the mobile communication terminal 100 increases the counter value at S529.

The mobile communication terminal 100 determines whether the counter value is equal to or greater than the reference value at S531. If the counter value is less than the reference value at S531, the mobile communication terminal 100 transmits or receives data to/from the network 600 at S533. Otherwise, if the counter value is equal to or greater than the reference value at S531, the mobile communication terminal 100 abandons the established access type and selects another access type at S535.

The mobile communication terminal 100 performs another access procedure according to the selected access type at S537. In one embodiment, the selected access type is indicative of the first phase access type, such that the mobile communication terminal 100 performs the access procedure of FIG. 6B.

Provided that the mobile communication terminal 100 selects the first phase access type, the mobile communication terminal 100 performs the access procedure of FIG. 6B. If the mobile communication terminal 100 detects the presence of the failure in the access procedure of FIG. 6B, it selects the second phase access type according to the determined result, such that it is able to perform the access procedure corresponding to the selected second phase access type.

As apparent from the above description, the mobile communication terminal according to the present invention can select another access type according to a network environment although there is a default access type in the mobile communication terminal, resulting in reduction of the probability of failure in the access procedure. The mobile communication terminal according to the present invention can effectively determine the failure or success of the access procedure when the access procedure is executed by the access control module contained in the mobile communication terminal.

If the access procedure corresponding to the default access type stored in the mobile communication terminal fails, the mobile communication terminal selects another access type instead of the established access type, and performs a new access procedure according to the selected access type, resulting in increased probability of success of the access procedure for the network.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for performing an access procedure of a mobile communication terminal in a data communication system, the method comprising:
    a) receiving a command for selecting an access type selection function using an input unit;
    b) performing an access procedure with a network according to an established access type, wherein the access procedure comprises a plurality of data transceiving steps;
    c) determining whether there is a failure of each of the plurality of data transceiving steps according to satisfying a transceiving failure condition of each of the plurality of date transceiving steps if the access type selection function is performed, wherein the transceiving failure condition is determined by the mobile communication terminal; wherein the data transceiving steps include: transmitting a data channel request message to the network; receiving a first data uplink assignment message from the network in response to the data channel request message; transmitting a data information request message to the network; and receiving a second data uplink assignment message from the network in response to the data information request message;
    d) adjusting a counter value of an access control module according to the determined result;
    e) determining a magnitude of the adjusted counter value in comparison with a reference value;
    f) abandoning the established access type and selecting another access type according to the determined magnitude of the adjusted counter value; and
    g) performing an access procedure with the network identical to the network at step (b) without a network changing according to the selected another access type.

2. The method according to claim 1, wherein the transceiving failure condition comprises
    at least one of conditions that:
    the number of transmission times of the data channel request message increases;
    the first data uplink assignment message is not received within a predetermined period of time;
    the second data uplink assignment message is not received within a predetermined period of time; and
    specific information contained in the second data uplink assignment message is different from information stored in the mobile communication terminal.

3. The method according to claim 1, wherein the data transceiving steps comprise:
    receiving a data uplink assignment message from the network in response to the data channel request message.

4. The method according to claim 3, wherein the transceiving failure condition comprises at least one of conditions that:
    the number of transmission times of the data channel request message increases;
    the data uplink assignment message is not received within a predetermined period of time; and
    specific information contained in the data uplink assignment message is different from information stored in the mobile communication terminal.

5. The method according to claim 1, wherein the adjusting comprises:
    if the failure of at least one step among the plurality of the data transceiving steps is determined, reducing the counter value; and
    if the failure of at least one step among the plurality of the data transceiving steps is not determined, increasing the counter value.

6. The method according to claim 5, wherein the abandoning and selecting comprises:
    if the counter value is less than the reference value, selecting another access type.

7. The method according to claim 1, wherein the adjusting comprises:
    if the failure of at least one step among the plurality of the data transceiving steps is determined, increasing the counter value; and
    if the failure of at least one step among the plurality of the data transceiving steps is not determined, reducing the counter value.

8. The method according to claim 7, wherein the abandoning and selecting comprises:
    if the counter value is equal to or greater than the reference value, selecting another access type.

9. The method according to claim 1, wherein the access procedure is executed at an acknowledged mode of a Radio Link Control (RLC) layer.

10. The method according to claim 1, wherein:
    if the data communication system is a General Packet Radio Service (GPRS) system, and the established access type is a first phase access type, another access type is indicative of a second phase access type; and
    if the data communication system is the GPRS system, and the established access type is the second phase access type, another access type is indicative of the first phase access type.

11. A mobile communication terminal for performing an access procedure in a data communication system comprising:
    an input unit configured to receive a command for selecting an access type selection function;
    a transceiver configured to perform an access procedure with a network according to an established access type, wherein the access procedure comprises a plurality of data transceiving steps;
    an access control module configured to determine whether there is a failure of each of the plurality of data transceiving steps according to satisfying a transceiving failure condition of each of the plurality of data transceiving steps if the access type selection function is performed, and to adjust a counter value according to the determined result, wherein the transceiving failure condition is determined by the mobile communication terminal; wherein the data transceiving steps include: if a data channel request message is transmitted to the network, receiving a first data uplink assignment message from the network by the transceiver; and if a data information request message is transmitted to the network, receiving a second data uplink assignment message from the network by the transceiver; and a controller configured to abandon the established access type and to select another access type according to a magnitude of the adjusted counter value in comparison with a reference value, wherein the transceiver performs an access procedure with the network identical to the network of the access procedure of the established access type without a network changing according to the selected another access type.

12. The mobile communication terminal according to claim 11, wherein the transceiving failure condition comprises at least one of conditions that:

the number of transmission times of the data channel request message increases;

the first data uplink assignment message is not received within a predetermined period of time;

the second data uplink assignment message is not received within a predetermined period of time; and specific information contained in the second data uplink assignment message is different from information stored in the mobile communication terminal.

13. The mobile communication terminal according to claim 11, wherein the data transceiving steps comprise:

if a data channel request message is transmitted to the network, the transceiver receives a data uplink assignment message from the network.

14. The mobile communication terminal according to claim 13, wherein the transceiving failure condition comprises at least one of conditions that:

the number of transmission times of the data channel request message increases;

the data uplink assignment message is not received within a predetermined period of time; and specific information contained in the data uplink assignment message is different from information stored in the mobile communication terminal.

15. The mobile communication terminal according to claim 11, wherein:

the access control module is further configured to reduce the counter value if the failure of at least one step among the plurality of data transceiving steps is detected, and to increase the counter value if the failure of at least one step among the plurality of data transceiving steps is not detected; and the controller is further configured to select another access type if the counter value of the access control module is less than the reference value.

16. The mobile communication terminal according to claim 11, wherein:

the access control module is further configured to increase the counter value if the failure of at least one step among the plurality of data transceiving steps is detected, and to reduce the counter value if the failure of at least one step among the plurality of data transceiving steps is not detected, and the controller is further configured to select another access type if the counter value of the access control module is equal to or greater than the reference value.

* * * * *